(12) United States Patent
Azadet

(10) Patent No.: US 6,202,075 B1
(45) Date of Patent: Mar. 13, 2001

(54) SECOND ORDER LMS TAP UPDATE ALGORITHM WITH HIGH TRACKING CAPABILITY

(75) Inventor: Kameran Azadet, Middletown, NJ (US)

(73) Assignee: Lucent Technologies, Inc., NJ (US)

( * ) Notice: Subject to any disclaimer, the term of this patent is extended or adjusted under 35 U.S.C. 154(b) by 0 days.

(21) Appl. No.: 09/206,519

(22) Filed: Dec. 7, 1998

(51) Int. Cl.$^7$ .................................................. G06F 17/10

(52) U.S. Cl. .................................... 708/322; 708/300

(58) Field of Search ........................ 708/300, 322–323, 708/320; 375/232–233

(56) References Cited

U.S. PATENT DOCUMENTS

| | | | | |
|---|---|---|---|---|
| 5,568,411 | * | 10/1996 | Batruni ................................. | 708/322 |
| 5,805,637 | * | 8/1998 | Hirosaka et al. ..................... | 708/323 |
| 6,009,448 | * | 12/1999 | Jong et al. ............................ | 708/322 |

OTHER PUBLICATIONS

Danfeng Xu, Yonghua Song, Gregory T. Uehara, "TP4.7: A 200MHz 9–Tap Analog Equalizer for Magnetic Disk Read Channels in 0.6m CMOS," ISSCC Digest of Technical Papers, pp. 74–75, Feb. 1996.

\* cited by examiner

*Primary Examiner*—Tan V. Mai

(57) ABSTRACT

The system and method of the present invention, according to one embodiment, employs an adaptive finite impulse response filter having a second order Least Mean Square (LMS) architecture. The filter comprises a plurality of signal feedback loops coupled in parallel, each feedback loop having a correlation multiplier, a loop filter and an integrator coupled in series. Each feedback loop is configured to generate a variable tap coefficient signal. Each loop filter is configured to generate a signal corresponding to the sum of a signal received by the loop filter and the integral of the signal received by the loop filter. The output of each loop filter is provided to an integrator which in turn provides the variable tap coefficient. The filter is configured to sum the products of the tap coefficient signals with delayed versions of the input signal in a tap delay line so as to generate the output signal of the filter. An error signal is genrated that corresponds to the difference between the output signal of the filter and a reference signal. In accordance with another embodiment of the invention, the tap signals are linearly time-varying and the error signal converges to zero.

23 Claims, 10 Drawing Sheets

STATIC CHANNEL

TIME-VARYING CHANNEL

K=4 [SIGN-SIGN]

US 6,202,075 B1

SECOND ORDER LMS TAP UPDATE ALGORITHM WITH HIGH TRACKING CAPABILITY

FIELD OF THE INVENTION

This invention relates to signal processing systems, and more specifically to an adaptive filter that employs a second order error tap adaptation scheme.

BACKGROUND OF THE INVENTION

Many applications, for example, wireless systems or other communication systems, employ digital adaptive filters to reduce error caused by a communication channel. Typically, such adaptive filters include a tapped delay lines to perform a convolution operation on a series of parameters known as tap coefficients and an incoming signal. These types of adaptive filters are also known as adaptive finite impulse response (AFIR) filters. The tap coefficients typically correspond to the impulse response of a channel through which the incoming signal arrives. Thus, for time-varying channels, such adaptive (AFIR) filters need to accurately and expeditiously converge their tap coefficients to appropriate values corresponding to the varying channel characteristics.

In order to derive appropriate tap coefficients, many adaptive filters employ an algorithm known as Least Mean Square or LMS algorithm. It is evident that in time-varying applications, speed of convergence and especially, tracking of the channel becomes critical. As such, conventional LMS systems may not be sufficient to fulfill adaptive filtering requirements.

FIG. 1 illustrates a typical prior art adaptive filter that employs a Least Means Square system to calculate the tap coefficients $W_k$ based on the following recursive equation:

$$W_k(n+1) = W_k(n) + \mu e(n) X_k(nT) n = 0, 1, \ldots L, \quad (1)$$

wherein $\mu$ is known as a step-size signal and $e(n)$ is the error signal and X is the received signal samples. As shown in FIG. 1, input terminal 12 is configured to receive a sequence of input signals X, which is routed through upper branch A of a tapped delay line 223. Upper branch A includes a plurality of delay elements 42, which are configured to provide a corresponding delayed version of signal X at their output terminal. The input terminal of each delay element is also coupled to a corresponding multiplier 40 that is configured to multiply the delayed version of signal X with a corresponding tap weight. The output terminals of each multiplier 40 is coupled to a corresponding adder 50, so as to accumulate the numbers generated by the multipliers along branch C. The accumulated value is provided to an input terminal of a subtractor 54, which is configured to generate an error signal e.

The other input of subtractor 54 is coupled to a reference signal 52, which corresponds to a series of training signals that are expected to be received by the receiver. In situations wherein training signals are not available, the output signal generated by the tapped delay line is provided to a slicer circuit (not shown) and in turn to subtractor 54. The error signal is provided to a step size multiplier 53, which is configured to multiply the error signal by a step size $\mu$.

The output terminal of step size multiplier 53 is coupled to a plurality of tap weight generating branches 55, which are configured to provide a tap weight signal or tap coefficient to each of the multipliers 40.

Each tap weight generating branch comprises a multiplier 18 having one input terminal coupled to the output terminal of step size multiplier 53. The other input terminal of each multiplier 18 is configured to receive a corresponding delayed version of signal X via the lower branch of adaptive filter 10. As such the lower branch of adaptive filter 10 includes a plurality of delay elements 44 that are configured to provide the delayed version of signal X at the same time intervals that delay elements 42 provide delayed versions of signal X at the upper branch of adaptive filter 10.

Each tap weight generating branch also comprises an integrator 32 that is coupled to the output terminal of the corresponding multiplier 18. Integrator 32 typically comprises an adder 34 coupled to a delay element 36 in a closed loop arrangement. The output terminal of integrator 32 (venerates the corresponding tap weight in each branch, and is coupled to the corresponding multiplier 40.

In an adaptive filter such as the one described in FIG. 1, the error signal may not converge substantially to zero while continuing to track the channel.

Thus, there is a need for an improved adaptive finite impulse response (AFIR) filter that employs a least Mean Square (LMS) algorithm where the error signal can converge substantially to zero.

SUMMARY OF THE INVENTION

The system and method of the present invention, according to one embodiment, employs an adaptive filter architecture for time-varying channels. The adaptive filter comprises a plurality of signal feedback loops coupled in parallel, each feedback loop having a correlation multiplier, a loop filter and an integrator coupled in series. Each feedback loop is configured to generate a tap signal. Each correlation multiplier is configured to generate a signal corresponding to the product of an input signal and an error signal. Each loop filter is configured to generate a signal corresponding to the sum of a signal received by the loop filter and the integral of the signal received by the loop filter. Each integrator is configured to generate a signal corresponding to the sum of a signal received by the integrator and a signal generated by the integrator during a previous time interval. The receiver is configured to sum the tap signals and to generate the error signal. The error signal corresponds to the difference between the summed tap signals and a reference signal.

In accordance with another embodiment of the invention, the signal received by the loop filter corresponds to the signal generated by the correlation multiplier, and the signal received by the integrator corresponds to the signal generated by the loop filter, while in another embodiment, the signal received by the integrator corresponds to the signal generated by the correlation multiplier, and the signal received by the loop filter corresponds to the signal generated by the integrator. Advantageously, the tap signals are linearly time-varying and the error signal converges substantially to zero. In one embodiment, wherein the input signals are received training signals, the reference signal corresponds to the transmitted training signal.

In another embodiment of the invention, the reference signal corresponds to output decision symbols generated by a slicing circuit that slices the output signals of the filter. The output signals of the slicer are referred to as "decision-directed" training signals.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE INVENTION

Figure 1:
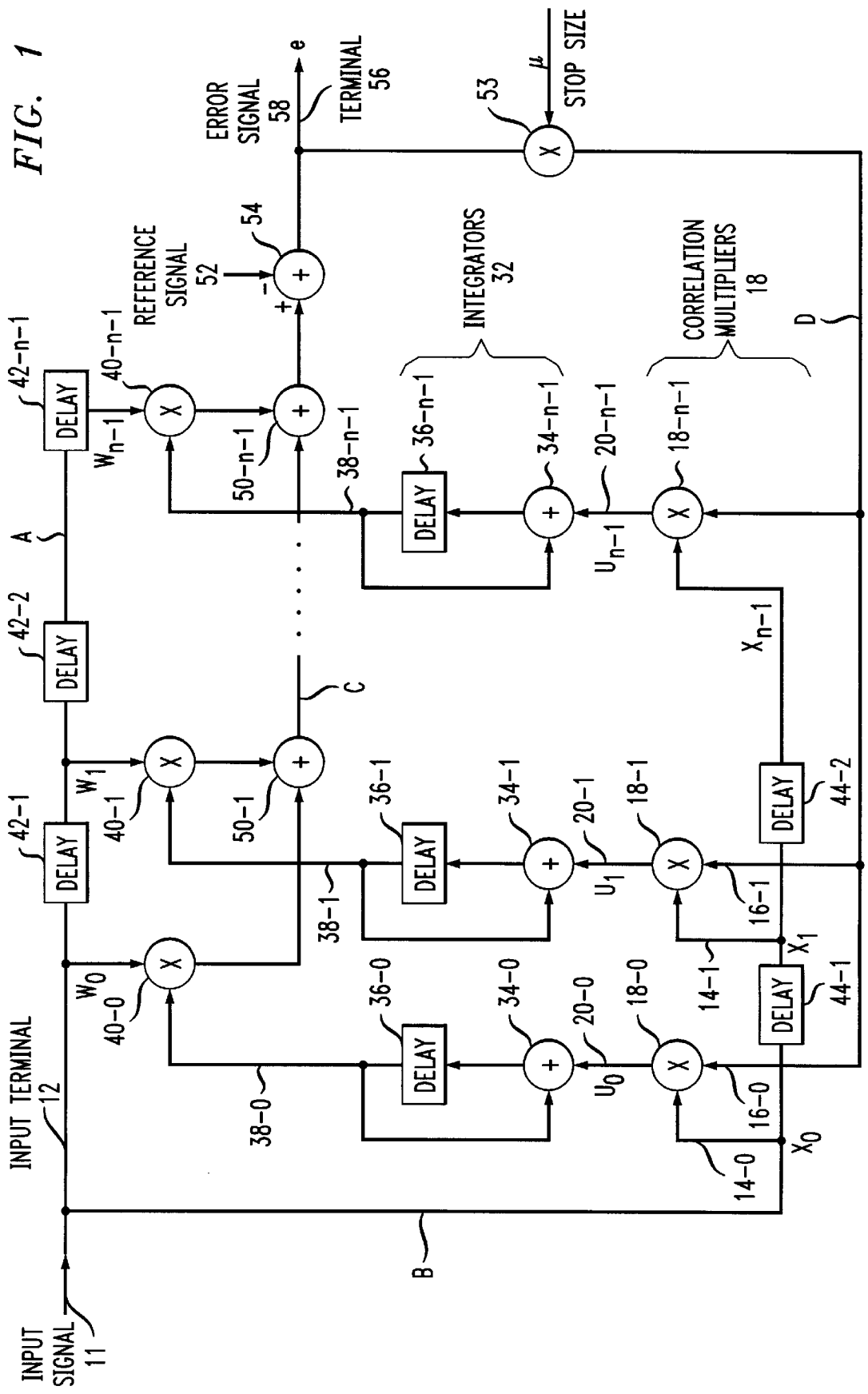
FIG. 1 illustrates a wireless receiver employing a typical Least Means Squared algorithm, as found in the prior art.

As mentioned above, the error signal derived by the Least Mean Square (LMS) algorithm employed in FIG. 1 may not converge to zero. This follows because, considering the output signals of integrators 22-0 through 22-n-1 to be linearly time-varying, the input signal of the integrators must be a non-zero, constant signal. If error signal 58 converges to zero in this circuit, then a zero signal is received at the second output of multipliers 18-0 through 18-n-1, resulting in a zero signal being outputted from the multipliers to the integrators. Thus, in order to track a time-varying channel, the receiver of the prior art must undesirably maintain a large error signal.

Figure 2:
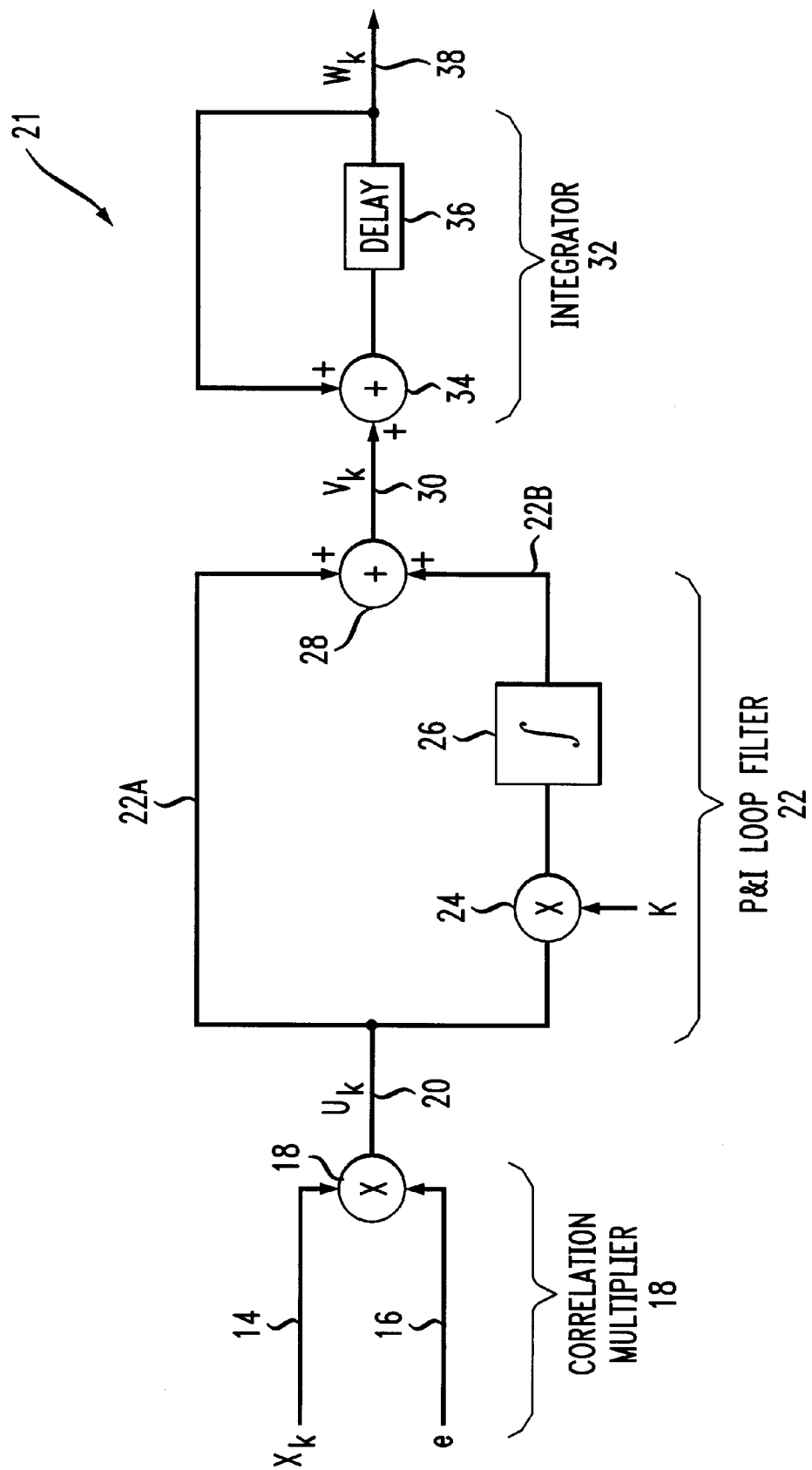
FIG. 2 illustrates a second order feedback loop for generating tap signals, in accordance with one embodiment of the present invention.

FIG. 2 illustrates a second order feedback loop 21 for generating tap signals, in accordance with one embodiment of the present invention. This feedback loop may be employed in a tap generating branch of an adaptive filter such as the one illustrated and described in FIG. 1. In the embodiment shown, the feedback loop comprises correlation multiplier 18, proportional and integral loop filter 22 and integrator 32, each coupled in series. In one embodiment, proportional and integral loop filter 22 is coupled between an output terminal of correlation multiplier 18 and an input terminal of integrator 32. In another embodiment, proportional and integral loop filter 22 is coupled to the output terminal of integrator 32.

Correlation multiplier 18 is coupled to and configured to receive input signal 14 and error signal 16, and to generate signal 20 corresponding to the product of both signals. Output signal 20 is received at an input terminal of proportional and integral loop filter 22, which is configured to generate a signal corresponding to the sum of the received signal and the integral of the received signal. In the embodiment shown, proportional and integral loop filter 22 comprises a pair of branches, proportional branch 22a and integral branch 22b. Proportional branch 22a routes to accumulator 28 a signal corresponding to input signal 20. Integral branch 22b routes to accumulator 28 a signal corresponding to the integral of input signal 20. As shown, integral branch 22b routes input signal 20 to multiplier 24, where it is multiplied by a signal corresponding to a value k. In accordance with one embodiment of the invention, k is the negative power of 2. Integrator 26 then integrates the signal received from multiplier 24, and the output is received by accumulator 28.

Accumulator 28 adds the signals received via proportional branch 22a and integral branch 22b and outputs signal 30. Signal 30 is received at an input terminal of integrator 32, which is configured to generate a signal corresponding to the sum of the signal received by the integrator and a signal that was generated by the integrator during a previous time interval. In the embodiment shown, integrator 32 comprises accumulator 34, a first input terminal of which is coupled to the output of accumulator 28 to receive signal 30, and a second input terminal of which is coupled to an output terminal of delay 36 to receive a signal from the output of delay 36. The output signal of delay 36 corresponds to a signal that was outputted by accumulator 34 in a previous time interval. Integrator 32 outputs signal 38.

Figure 3:
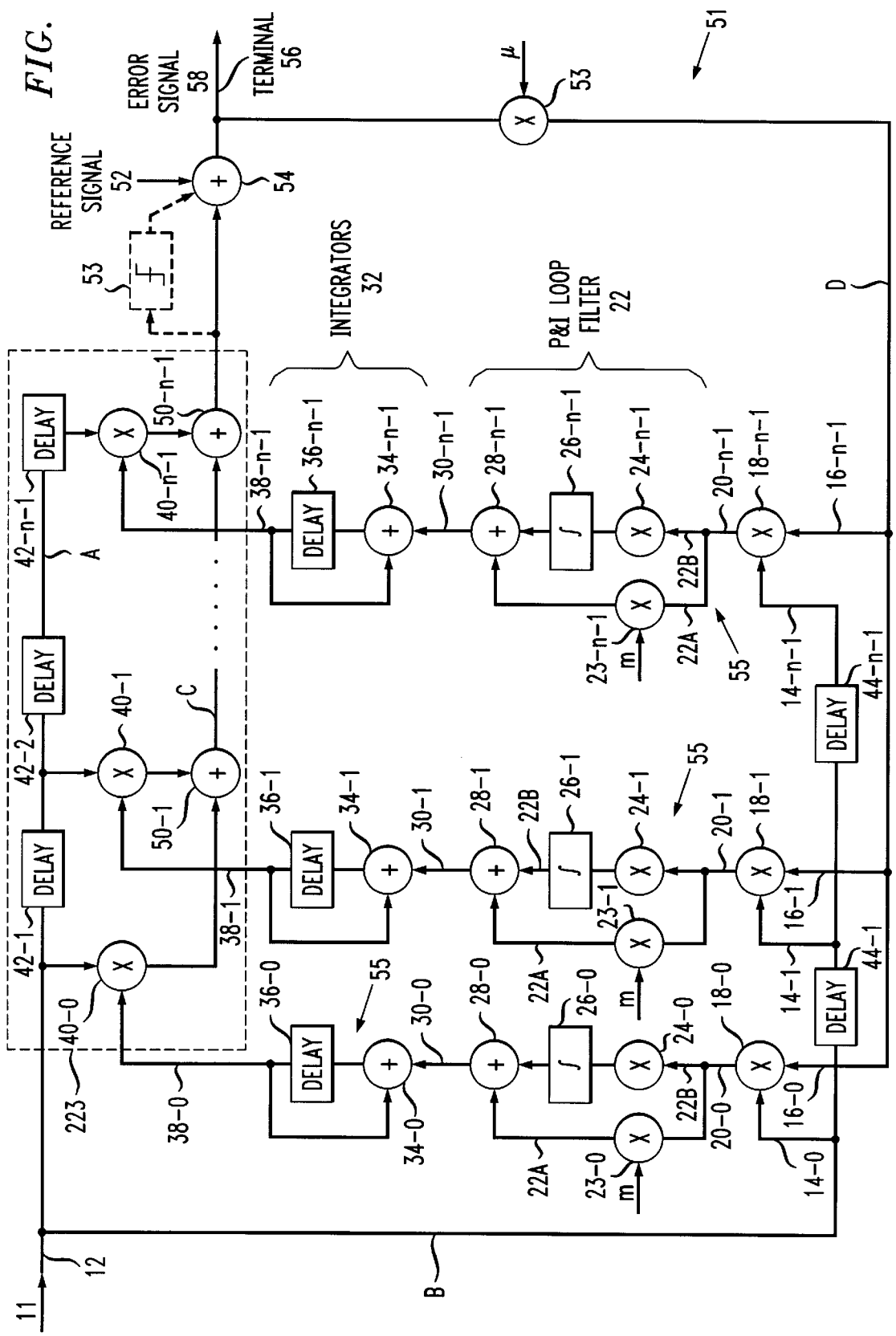
FIG. 3 illustrates an adaptive finite impulse response (AFIR) filter employing a second order feedback loop, in accordance with one embodiment of the present invention.

FIG. 3 illustrates an adaptive filter 51 employing a second order feedback loop, in accordance with one embodiment of the present invention. As shown in the figure, input terminal 12 is configured to receive a sequence of input signals X, which is routed through upper branch A. Upper branch A includes a plurality of delay elements 42, which are configured to provide a corresponding delayed version of signal X at their output terminal. The input terminal of each delay element is also coupled to a corresponding multiplier 40 that is configured to multiply the delayed version of signal X with a corresponding tap weight. The output terminals of each multiplier 40 is coupled to a corresponding adder 50, so as to accumulate the numbers generated by the multipliers along branch C. The accumulated value is provided to an input terminal of a subtractor 54, which is configured to generate an error signal e.

The other input of subtractor 54 is coupled to a reference signal 52, which corresponds to the training signals that are expected to be received by the receiver. In accordance with another embodiment of the invention, the receiving signal by adaptive filter 51 does not contain training signals. In that event, the output port of the last accumulator in branch C—which provides the output signal of adaptive filter 51—is coupled to a slicer circuit 53 as illustrated by the dotted lines. The output port of slicer 53 is coupled to an input port of subtractor 54. Slicer 53 acts as a decision making circuit that generates a predetermined signal level based, among other things, on the value of the signal provided by the output terminal of filter 51. The error signal is provided to a step size multiplier 53, which is configured to multiply the error signal by a step size $\mu$.

The output terminal of step size multiplier 53 is coupled to a plurality of tap weight generating branches 55, which are configured to provided a tap weight signal to each of the multipliers 40.

Each tap weight generating branch comprises a multiplier 18 having one input terminal coupled to the output terminal of step size multiplier 53. The other input terminal of each multiplier 18 is configured to receive a corresponding delayed version of signal X via the lower branch of adaptive filter 10. As such the lower branch of adaptive filter 10 includes a plurality of delay elements 44 that are configured to provide the delayed version of signal X at the same time intervals that delay elements 42 provide delayed versions of signal X at the upper branch of adaptive filter 10.

Each tap weight generating branch also comprises a proportional and integral loop filter 22 as described in FIG. 2. The output port of loop filter 22 is coupled to an integrator 32, which in turn is coupled to the output terminal of the corresponding multiplier 18. Integrator 32 comprises an adder 34 coupled to a delay element 36 in a closed loop arrangement. The output terminal of integrator 32 generates the corresponding tap weight in each branch, and is coupled to the corresponding multiplier 40.

With reference to proportional and integral loop filters 55, each loop filter is configured to generate a signal corresponding to the sum of the received signal and the integral of the received signal. In the embodiment shown, the proportional and integral loop filters each comprise a pair of branches, proportional branch 22a and integral branch 22b. Output signals 20 through 20-n-1 are routed to accumulators 28-0 through 28-n-1, respectively, via the proportional branch. Although FIG. 2 shows proportional branch 22a as routing the signal without performing any functions thereon, the embodiment of FIG. 3 includes multipliers 23-0 through 23-n-1, which cause the signal to be multiplied by a signal having a numerical value m.

Output signals 20-0 through 20-n-1are also routed to accumulators 28-0 through 28-n-1 via the integral branch. In the embodiment shown in FIG. 3, in each integral branch, the signal is inputted to multiplier 24-0 through 24-n-1, respectively. Each multiplier multiplies the received signal by a signal corresponding to a value k. Integrators 26-0 through 26-n-1 then integrate the signal received from the multipliers, and output a signal to be received by accumulators 28-0 through 28-n-1.

The accumulators add the signals received via proportional branch 22a and integral branch 22b and provide their output signals to integrators 55.

Unlike the receivers of the prior art, the receiver of the present invention, in accordance with one embodiment, permits error signal 58 to converge substantially to zero. As previously discussed, error signal 58 advantageously converges to zero, such that the actually received training signal approaches the transmitted training signal expected to be received, and such that error are less likely to occur when subsequent signals are transmitted. In the receiver shown, considering the output signals of integrators 22-0 through 22-n-1 to be linearly time-varying, the input signal of the integrators are not required to be a non-zero, constant signal, as in the prior art. This follows because, if error signal 58 converges to zero in this receiver, a zero signal is received at the second output of multipliers 18-0 through 18-n-1 and a zero signal is output from the multipliers to the proportional and integral loop filter. The signal that is received by integrator 26-0 through 26-n-1 of the proportional and integral loop filters is integrated, and a non-zero signal is generated. This non-zero signal is then accumulated at accumulators 28-0 through 28-n-1, and then routed through integrators 32-0 through 32-n-1, respectively. The result of these operations is that the signal that is received by multipliers 40-0 through 40-n-1 to be summed and compared at accumulator 54, does not have a zero value. Instead, even though error signal 58 has been caused to converge to zero, as is desirable, a signal having a non-zero value is compared at accumulator 54, thus permitting continued tracking of the channel.

According to one embodiment of the invention, in a discrete time implementation, the integration function performed by integral branch 22b of proportional and integral loop filter 22 is $(kz^{-1})/(1-z^{-1})$. The entire loop filter has a z-transform of:

$$LF(z)=1+(kz^{-1})/(1-z^{-1}).$$

In accordance with one embodiment, k is a small constant number. In still another embodiment of the invention, k is a negative power of two.

Figure 4:
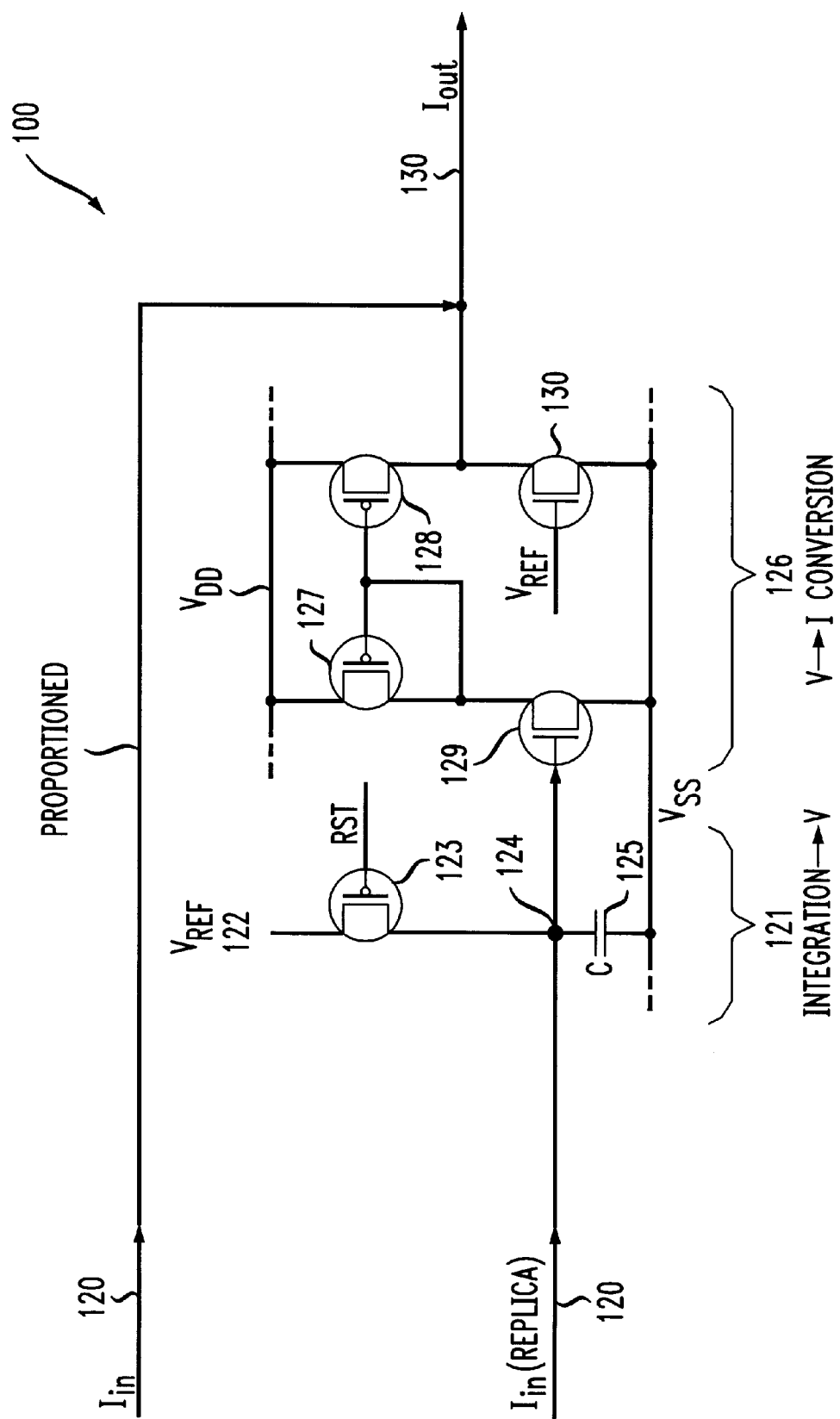
FIG. 4 illustrates the salient components of an analog proportional and integral loop filter, as would be employed by one embodiment of the present invention.

In still another embodiment of the invention, an analog receiver is employed. FIG. 4 illustrates the salient components of a proportional and integral loop filter, as would be employed by one embodiment of an analog receiver. Generally, proportional and integral loop filter 100 receives input current signals 120 at each branch. The proportional branch outputs current signal 120 to be added to the current signal generated by the integral branch. The integral branch comprises an integration unit 121, comprising a capacitor 125 configured to receive input current signal $I_{in}$. Capacitor 125 is coupled to a biasing transistor 123 and reference voltage-signal source 122. Capacitor 125 integrates the signal provided to integration branch and, in turn provides the integrated signal to voltage to current converter 126, which is configured to convert the voltage signal provided by capacitor 125 into a current signal.

Voltage-to-current converter 126 comprises a differential pair input stage including transistors 129 and 130. The gate terminal of transistor 129 is configured to receive the voltage signal provided by capacitor 125. Similarly, the gate terminal of transistor 130 is configured to receive a reference voltage signal $V_{ref}$. Transistor 127 and 126 are coupled respectively to the drain terminals of transistors 129 and 130 in a current mirror arrangement. The source terminal of transistor 128 provides a current signal corresponding to the voltage signal provided at the base terminal of transistor 129.

The output terminal of voltage-to-current converter 126 is coupled to the proportional branch so that the combined current signals are outputted from the proportional and integral loop filter as output current signal 130.

In accordance with another embodiment of the invention, in order to reduce the complexity of correlation multipliers 18 in FIG. 3, one or both of the input signal X and error signal e provided to the multiplier are quantized to lower number of bits. For example, the quantization can be as low as 1 bit or just the sign bit. When only the sign bit of input signal X and sign bit of error signal e is used, the multiplication is referred to as sign-sign multiplication. In that event multiplexers 18 are a 1 bit multiplexer or an XOR gate.

Figure 5:
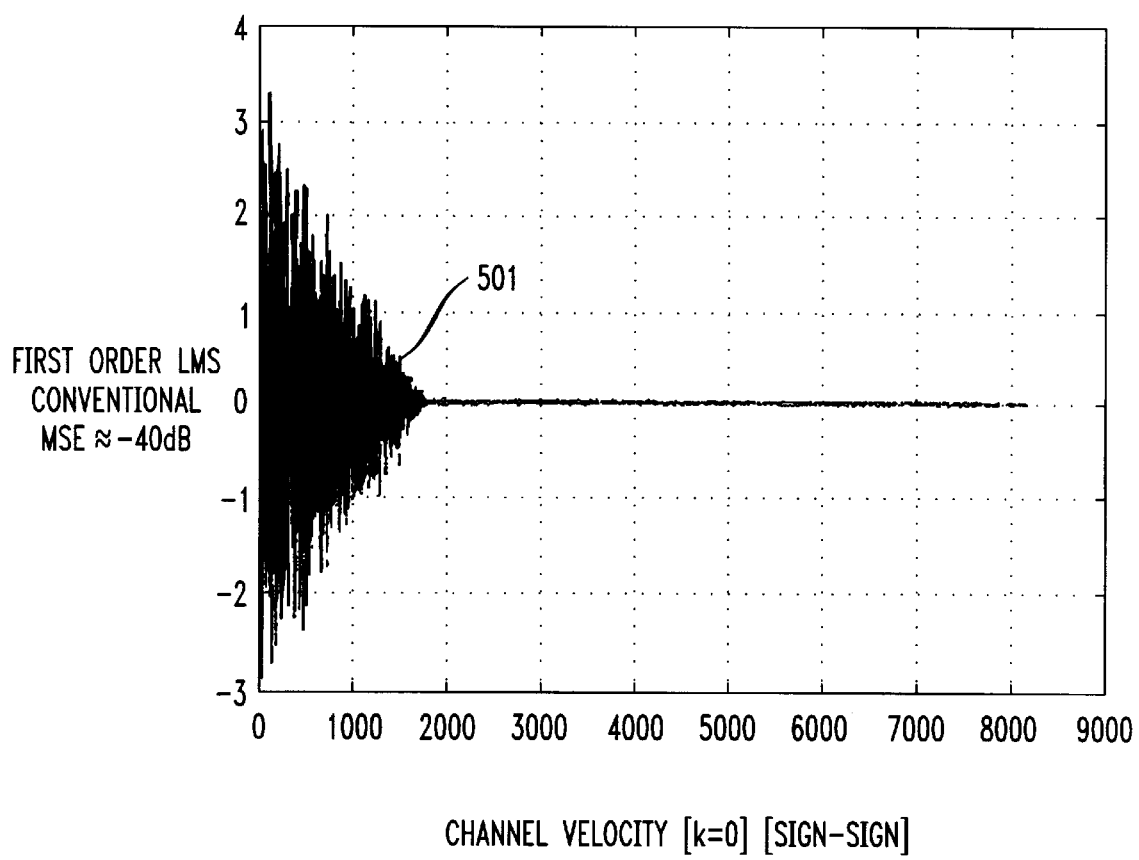
FIGS. 5 and 6 represent simulation results obtained for typical prior art adaptive filter employing a first-order Least Means Squared algorithm.
Figure 6:
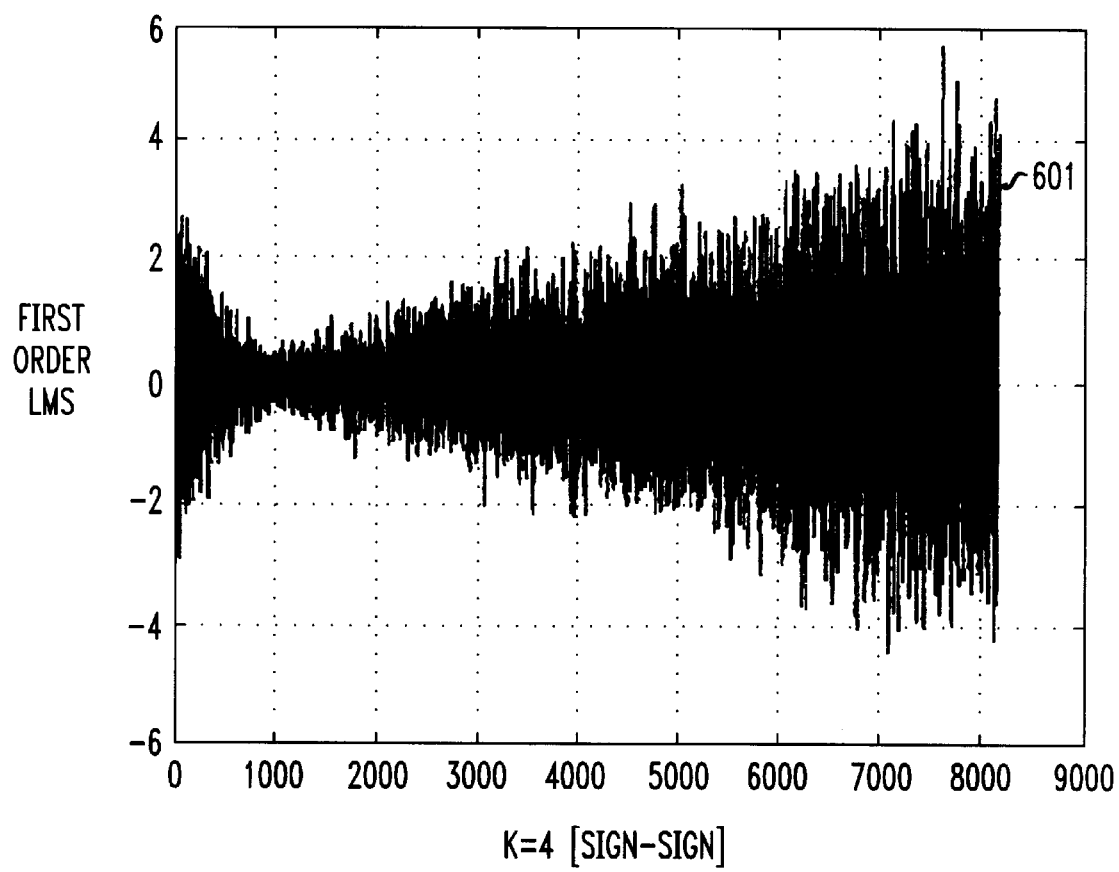

As previously discussed, the error signal derived by the adaptive filter of the present invention converges substantially to zero, unlike the error signal derived by the adaptive filter of the prior art. FIGS. 5 through 10 are graphs that illustrate simulation results. FIGS. 5 and 6 represent the results obtained for a prior art adaptive filter. In FIG. 5, plotline 501 represents the error signal generated by an adaptive filter of the prior art employing a first-order Least Means Square algorithm, and estimating a static channel with a phase drift ratio K=0. The phase drift ratio is expressed in 1/8192 of baud period. The multiplication is based on sign-sign architecture. The Mean Squared Error (MSE) for this embodiment is approximately −40dB. The Mean Squared Error (MSE) is defined as $E(e^2)$ or $10 \log_{10}(E(e^2))$ in dB. It is noted that for insuring a fair comparison between the first order Least Mean Square (LMS) architecture and the second order Least Mean Square (LMS) architecture in accordance with the present invention, the step size $\mu$'s were scaled so that after convergence, Mean Squared Error (MSE) is approximately −40dB.

In FIG. 6, plotline 601 also represents the error signal generated by an adaptive filter of the prior art employing a first-order Least Means Square algorithm, in this case estimating a time-varying channel with a phase drift ratio K=4. In FIG. 6, error signal 601 does not converge to zero, and instead progressively increases in amplitude.

Figure 7:
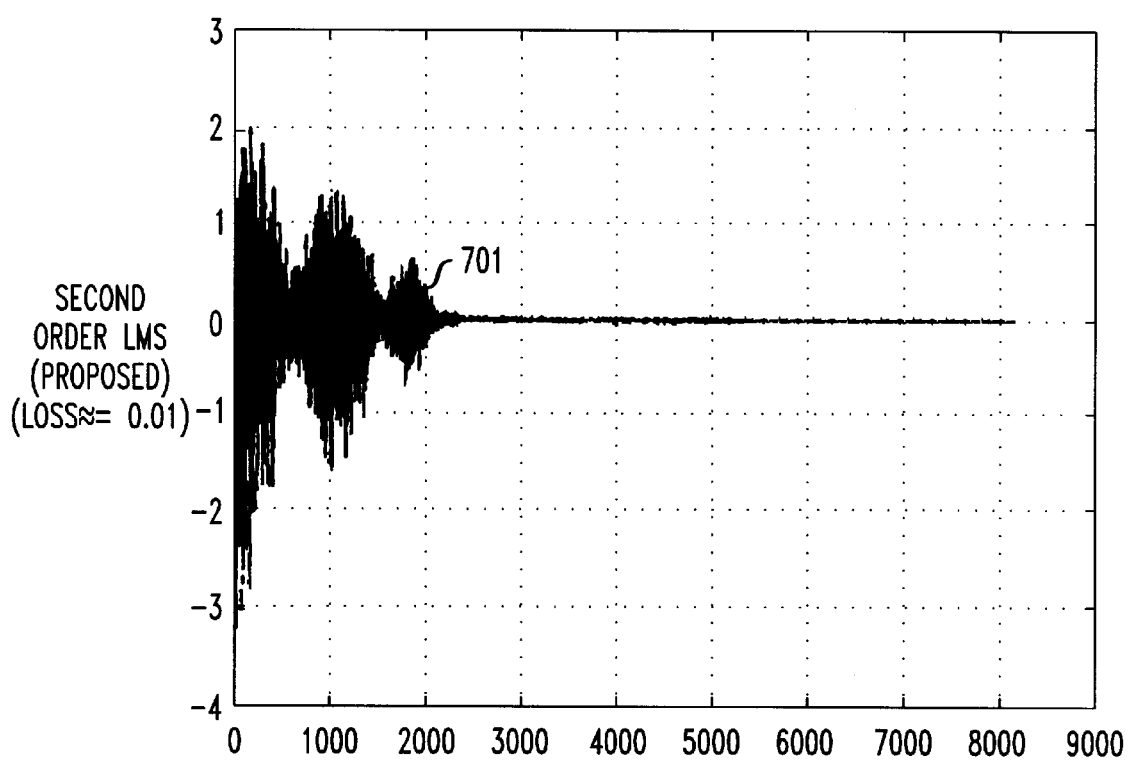
FIGS. 7 through 10 represent simulation results obtained for an adaptive filter employing a second-order Least Means Square algorithm, in accordance with various embodiments of the present invention.

FIGS. 7 through 10 represent the simulation results obtained for adaptive filter s, in accordance with various embodiments of the present invention. In FIG. 7, plotline 701 represents the error signal generated by an adaptive filter, in accordance with one embodiment, employing a second-order Least Means Square algorithm, estimating a static channel with a phase drift ratio K=0 and employing a loss parameter of k=0.01, wherein k is the loss parameter in the integration loop of FIGS. 2 and 3. The Mean Squared Error for this embodiment is approximately −40dB.

Figure 8:
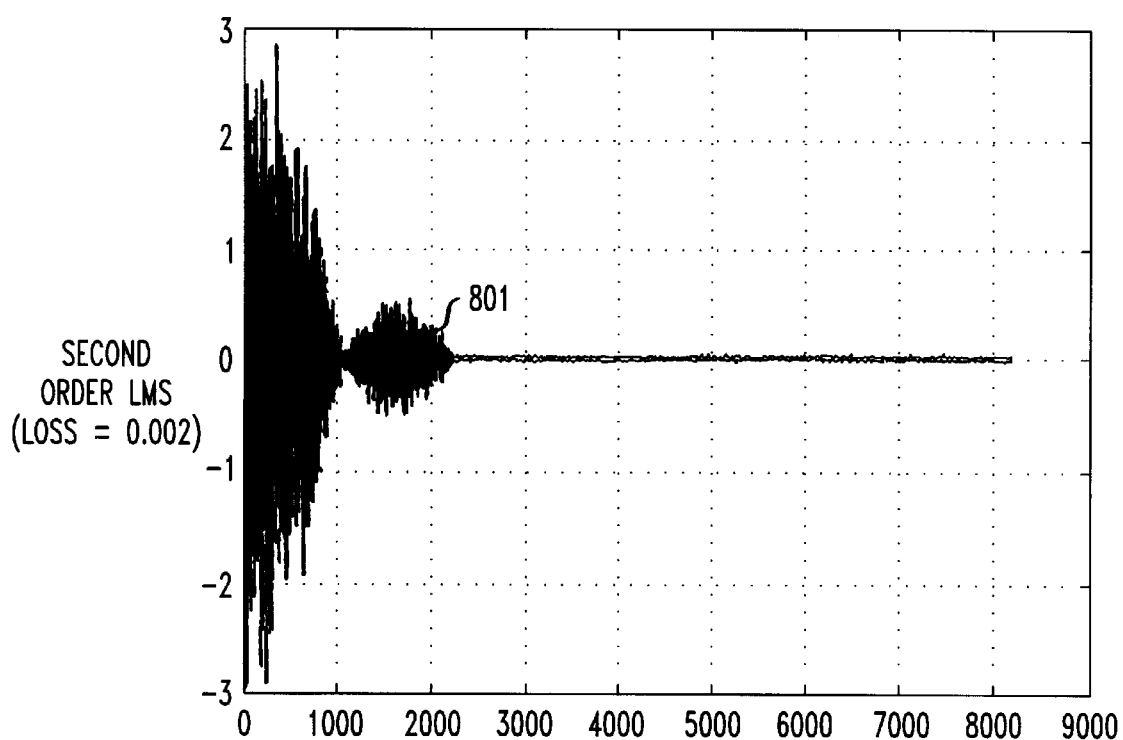

Similarly, in FIG. 8, plotline 801 represents the error signal generated by an adaptive filter, in accordance with another embodiment, employing, a second-order Least Means Square algorithm. In the embodiment illustrated by FIG. 8, the adaptive filter estimates a static channel and employs a loss parameter of k=0.002. The Mean Square Error (MSE) for this embodiment is also around −40dB. Both plotlines, as shown, converge substantially to zero.

Figure 9:
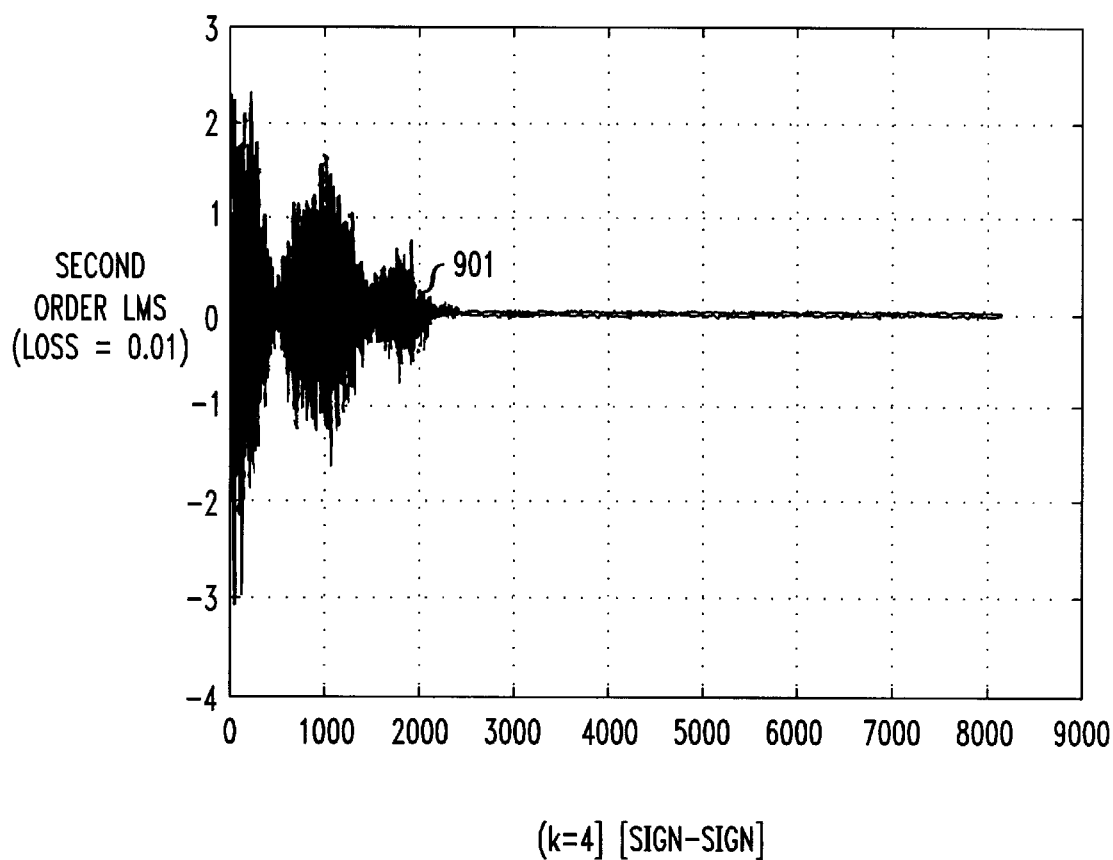
Figure 10:
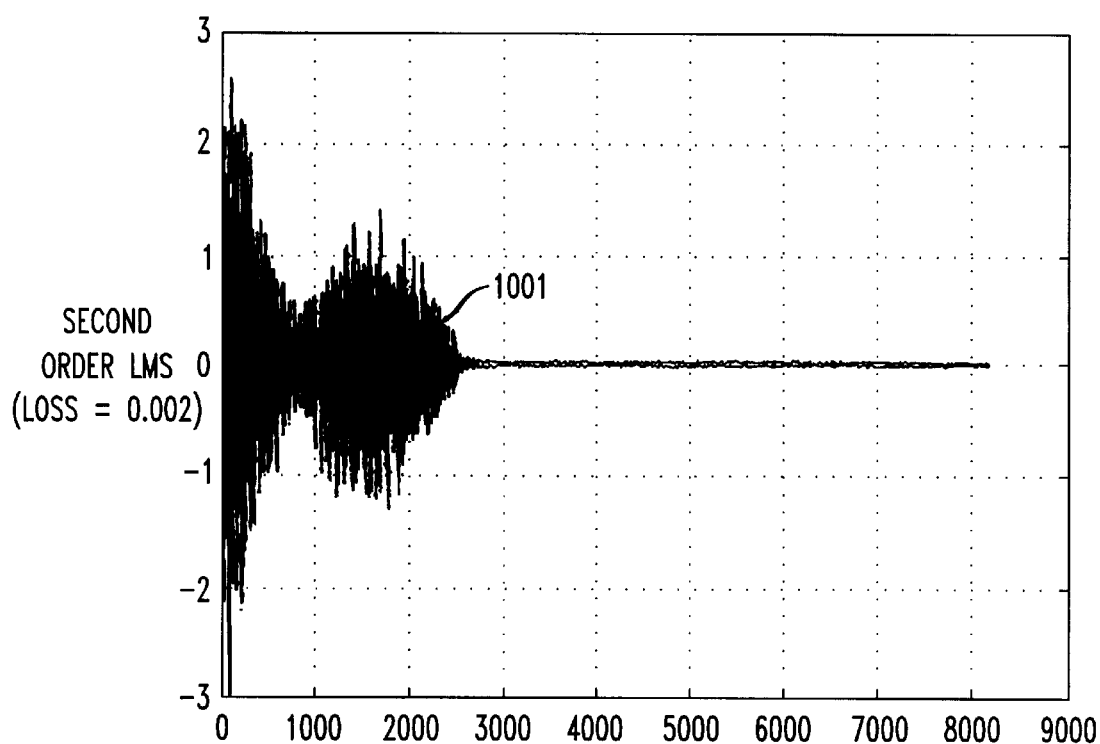

In FIG. 9, plotline 901 represents the error signal generated by an adaptive filter, in accordance with another embodiment of the invention, employing a second-order Least Means Square algorithm, estimating a time-varying channel with a phase drift ration K=4 and employing a loss parameter k=0.01. In FIG. 10, plotline 1001 represents the error signal generated by an adaptive filter employing a second-order Least Means Square algorithm, in this case also estimating a time-varying channel with a phase drift ratio K=4 but employing a loss parameter k=0.002. Unlike the adaptive filter corresponding to FIG. 6, the adaptive filter according to various embodiments of the present invention converges substantially to zero when estimating a time-varying channel.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

The foregoing merely illustrates the principles of the invention. It will thus be appreciated that those skilled in the art will be able to devise various arrangements which, although not explicitly shown or described herein, embody the principles of the invention and thus are within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the Figs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non volatile storage. Other hardware, conventional and/or custom, may also be included. Similarly, any switches shown in the Figs. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner called for in the claims. Applicants thus regard any means which can provide those functionalities as equivalent to those shown herein.

What is claimed is:

1. An adaptive filter employing a least mean squared (LMS) error correction arrangement to reduce the amplitude of error signals generated corresponding to received signals, said adaptive filter comprising:
   a tapped delay line configured to multiply a plurality of delayed versions of said received signal by a corresponding variable tap coefficient signal so as to generate the output signal of said adaptive filter;
   a plurality of signal feedback loops coupled in parallel, each said feedback loop having a correlation multiplier, a loop filter and an integrator coupled in series, each said feedback loop configured to generate said variable tap coefficient signal as a function of said error signals;
   each said loop filter configured to generate a signal corresponding to the sum of a signal received by said loop filter and the integral of said signal received by said loop filter; and
   said filter configured to generate said error signal corresponding to the difference between said output signal of said filter and a reference signal.

2. The apparatus according to claim 1, wherein each of said correlation multipliers is configured to receive said error signal and a delayed version of said input signal.

3. The apparatus according to claim 1, wherein each of said correlation multipliers is configured to receive a sign bit corresponding to said error signal.

4. The apparatus according to claim 3, wherein each of said correlation multipliers is configured to receive a sign bit corresponding to said delayed version of said input signals.

5. The apparatus according to claim 1, wherein said signal received by said loop filter corresponds to said signal generated by said correlation multiplier, and said signal received by said integrator corresponds to said signal generated by said loop filter.

6. The apparatus according to claim 1, wherein said signal received by said integrator corresponds to said signal generated by said correlation multiplier, and said signal received by said loop filter corresponds to said signal generated by said integrator.

7. The apparatus according to claim 6, wherein said reference signal corresponds to a transmitted training signal.

8. The apparatus according to claim 1, wherein said tap coefficient signals are linearly time-varying.

9. The apparatus according to claim 1, wherein said error signal converges to substantially a zero signal level.

10. The apparatus according to claim 1, wherein said input signals include received training signals.

11. The apparatus according to claim 1 wherein said reference signal is generated by a decision making circuit.

12. The apparatus according to claim 1 wherein said decision making circuit is a slicer coupled to an output port of said filter.

13. The apparatus according to claim 1, wherein said loop filter comprises a proportional and integral loop filter having a proportional branch, an integral branch and an accumulator, said proportional branch configured to route to said accumulator a signal corresponding to an input signal received by said loop filter, said integral branch configured to route to said accumulator a signal corresponding to the integral of said input signal received by said loop filter, said accumulator configured to add said routed signals and to output said generated signal.

14. The apparatus according to claim 13, wherein an integration function performed by said integral branch of said loop filter 22 corresponds to $(kz^{-1})/(1-z^{-1})$, and said entire loop filter has a z-transform of corresponding to $1+(kz^{-1})/(1-z^{-1})$, wherein k is a loss parameter number.

15. The apparatus according to claim 14, wherein k is a negative power of two.

16. A method for correcting errors that occur when transmitting signals via a wireless communications system, said method comprising the steps of:

receiving a sequence of input signal;

generating variable tap signals from each of a plurality of parallel coupled feedback loops, each said feedback loop performing the steps of multiplying said input signal and an error signal, summing a first signal and the integral of said first signal, and summing a second signal and a signal corresponding to said second signal in a previous time interval;

multiplying said tap signals with a plurality of delayed versions of said input signal and summing results of said multiplication; and generating a sequence of said error signals by calculating the difference between said summed results and a reference signal.

17. The method according to claim 16, wherein said first signal corresponds to said product of said input signal and said error signal, and wherein said second signal corresponds to said sum of said first signal and said integral of said first signal.

18. The method according to claim 16, wherein said second signal corresponds to said product of said input signal and said error signal, and wherein said first signal corresponds to said sum of said second signal and a signal corresponding to said second signal in a previous time interval.

19. The method according to claim 16, wherein said tap signals are linearly time-varying.

20. The method according to claim 19, wherein said error signal converges to substantially a zero signal level.

21. The method according to claim 16, wherein said input signals include training signals.

22. The method according to claim 21, wherein said reference signal corresponds to said training signal.

23. A tap generator in an adaptive filter employing a least mean squared (LMS) error correction arrangement to reduce the amplitude of error signals generated corresponding to received signals, said tap generator comprising:

a correlation multiplier configured to receive said error signal and a delayed version of said received signal;

a loop filter coupled to said correlation multiplier further comprising a proportional branch and a first integrator branch;

an adder coupled to said loop filter for adding signals transmitted through said proportional and integrator branches; and a second integrator coupled to said loop filter.

* * * * *